Patented July 10, 1923.

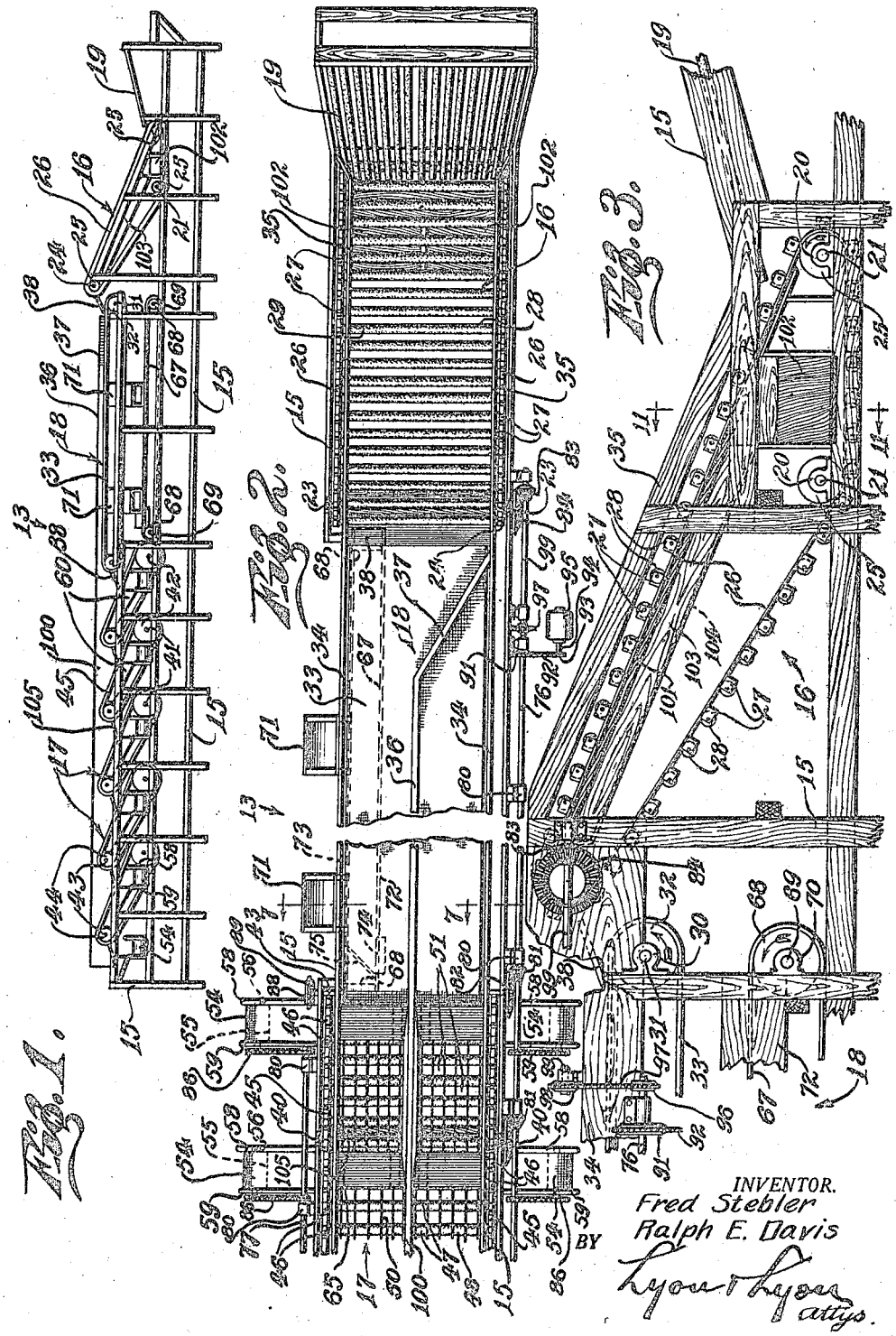

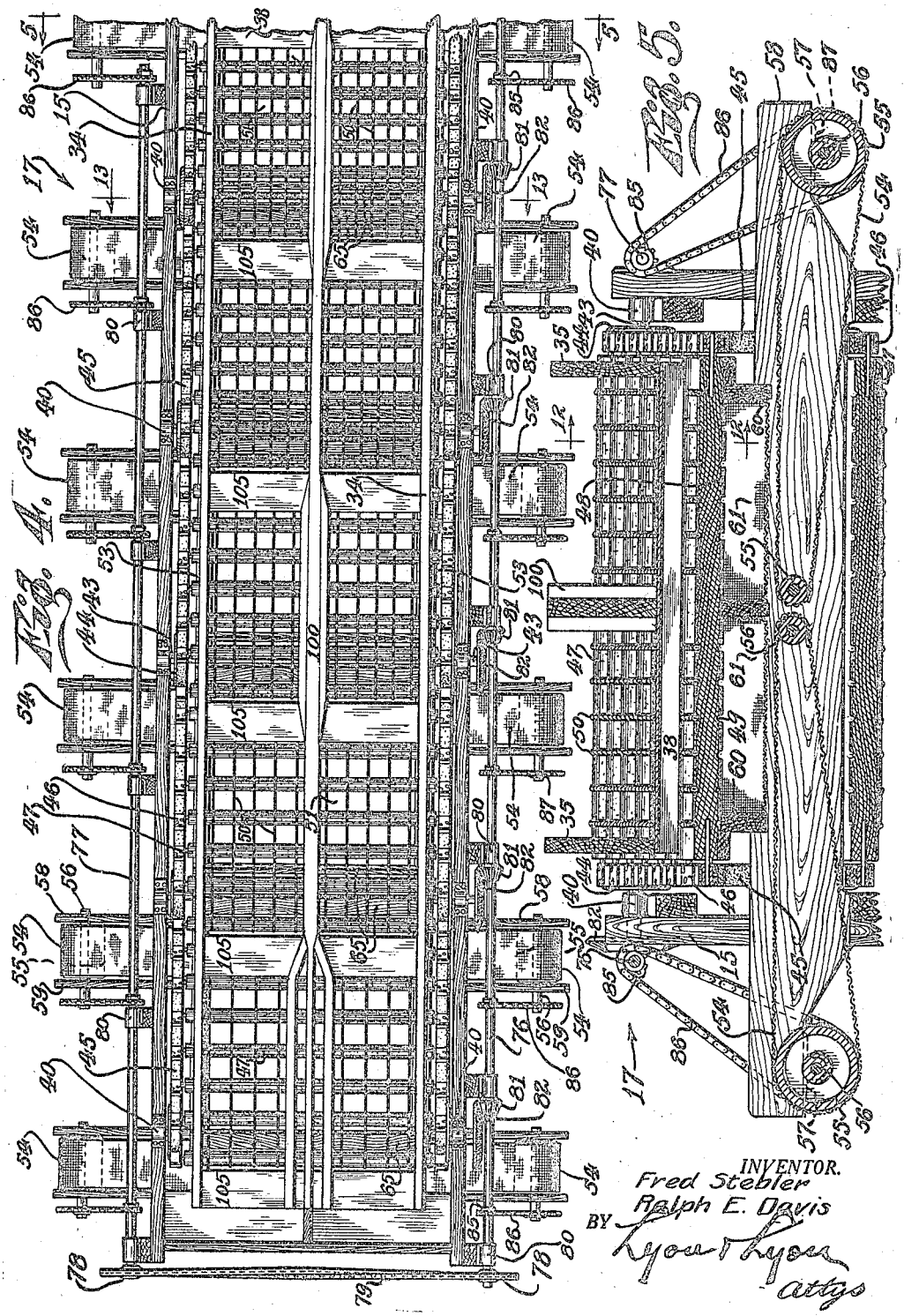

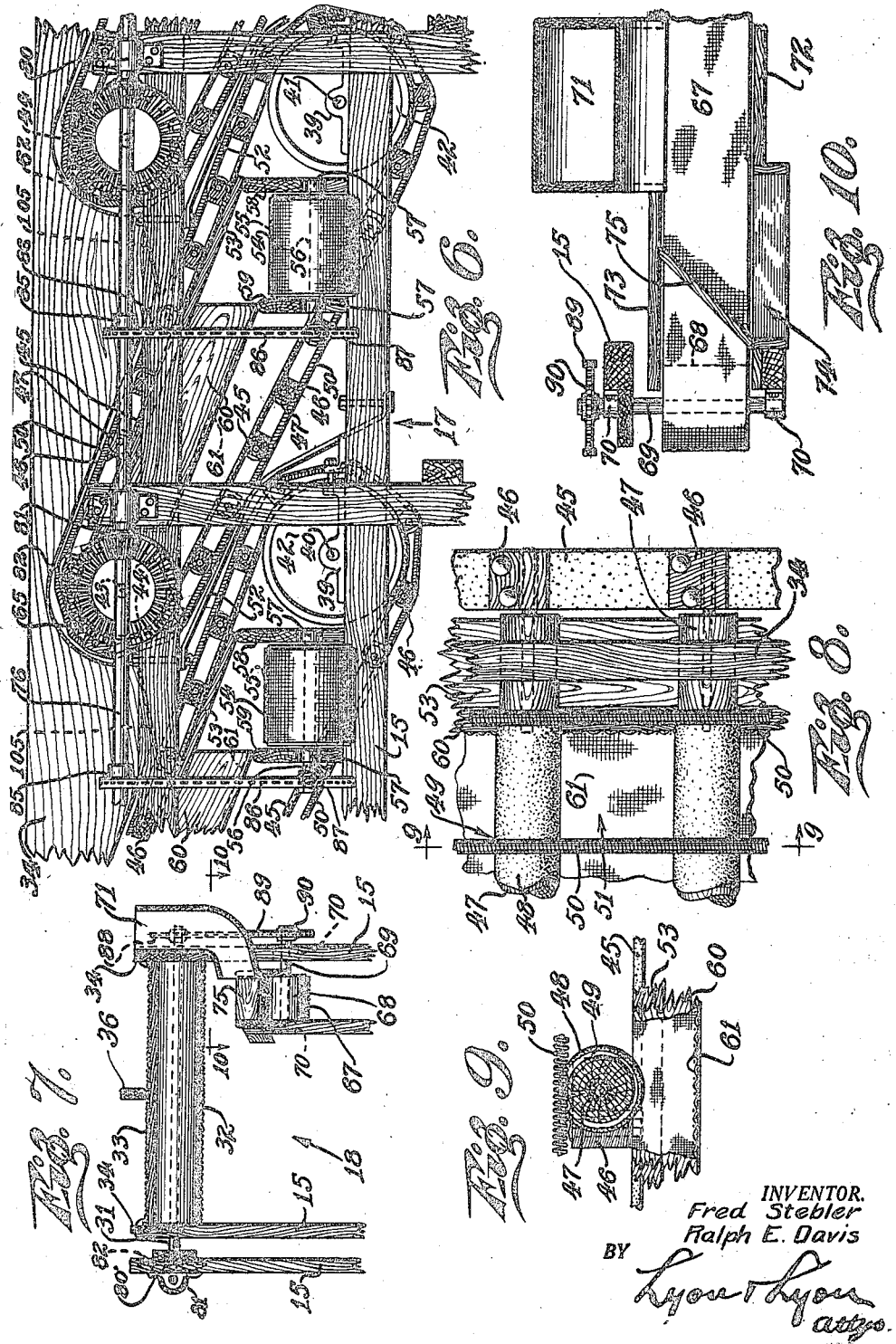

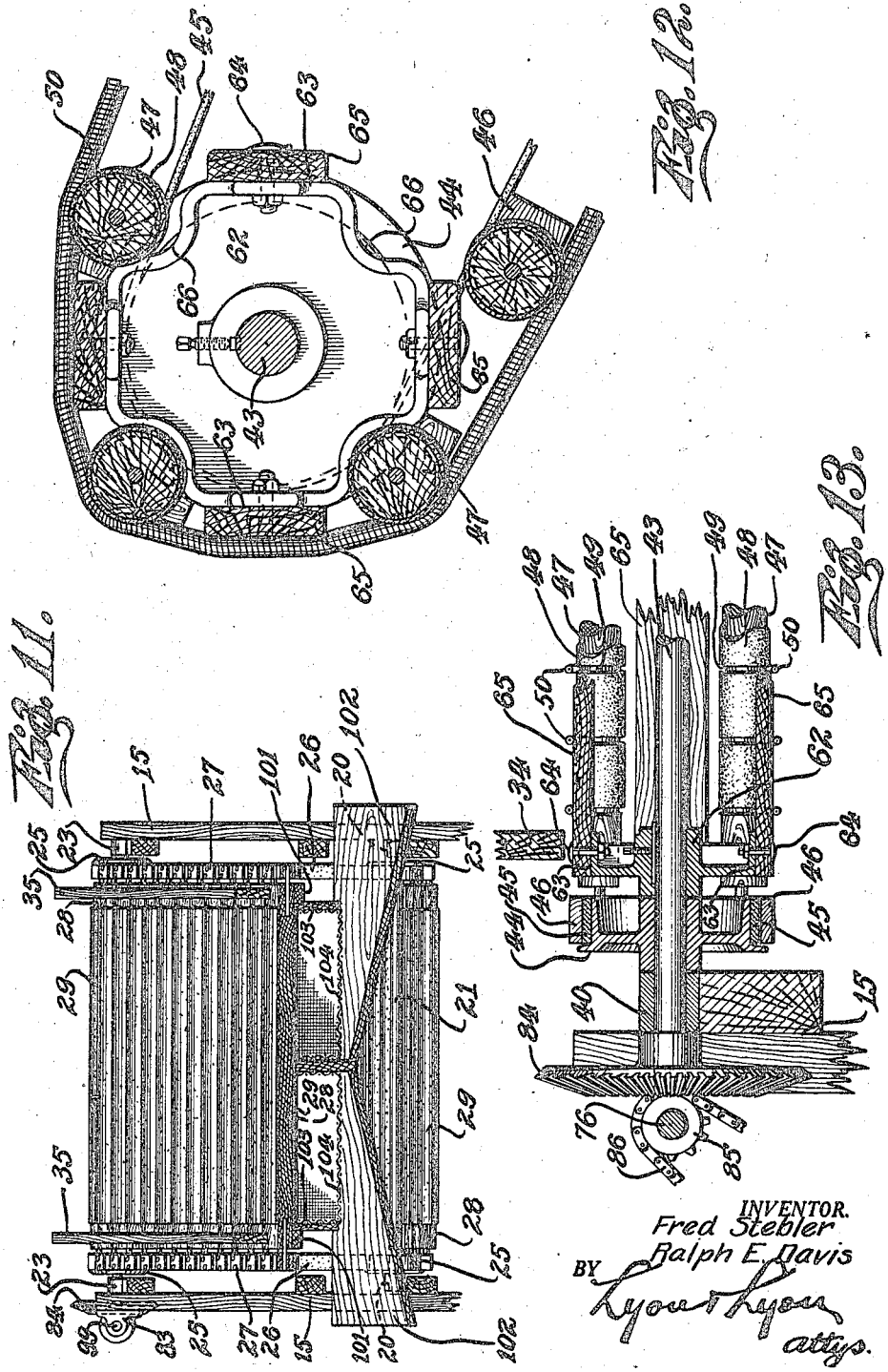

1,461,702

UNITED STATES PATENT OFFICE.

FRED STEBLER AND RALPH E. DAVIS, OF RIVERSIDE, CALIFORNIA, ASSIGNORS TO STEBLER PARKER CO., OF RIVERSIDE, CALIFORNIA, A CORPORATION OF CALIFORNIA.

FRUIT-SIZING APPARATUS.

Application filed February 16, 1922. Serial No. 536,896.

*To all whom it may concern:*

Be it known that we, FRED STEBLER and RALPH E. DAVIS, citizens of the United States, residing at Riverside, in the county of Riverside and State of California, have invented a new and useful Fruit-Sizing Apparatus, of which the following is a specification.

This invention relates to an apparatus for sizing fruit, and under the term "fruit" is meant not only fruit but likewise vegetables. This broadening of the term "fruit" to include vegetables is for the purpose of simplifying this specification.

Though the apparatus may be efficiently employed to grade any fruit by size, it is especially useful in grading such fruit as apples, many varieties of which have a long and short diameter. As is well known, some varieties of apples are elongated in the direction of the core, while other varieties are larger in diameter in a plane transversely of the core. In other words, many varieties of apples, unlike most oranges, are not perfectly spherical, but more or less oval, as described above.

One of the principal objects of this invention is to accurately grade fruit according to the longer diameter.

Another object is to provide an apparatus having a comparatively great capacity compared with its size.

The accompanying drawings illustrate the invention:

Fig. 1 is a side elevation of an apparatus embodying the invention. The view is more or less diagrammatic and the driving mechanism is omitted.

Fig. 2 is an enlarged broken plan view of Fig. 1.

Fig. 3 is an enlarged fragmental elevation of the apparatus, showing the primary sizing unit.

Fig. 4 is an enlarged plane view of the left portion of the apparatus in Fig. 1, showing the series of secondary grading units.

Fig. 5 is an enlarged sectional elevation on the line indicated by 5—5, Fig. 4.

Fig. 6 is an enlarged fragmental side elevation of Fig. 4.

Fig. 7 is an enlarged fragmental sectional detail on the line indicated by 7—7, Fig. 2.

Fig. 8 is a plan detail of a fragment of one of the secondary sizing units.

Fig. 9 is a sectional detail on line indicated by 9—9, Fig. 8.

Fig. 10 is an enlarged fragmental plan section on the line indicated by 10—10, Fig. 7.

Fig. 11 is an enlarged elevation of the primary grading unit, partly in section on the line indicated by 11—11, Fig. 3.

Fig. 12 is a sectional detail on the line indicated by 12—12, Fig. 5, showing one of the fenders.

Fig. 13 is an enlarged sectional detail on the line indicated by 13—13, Fig. 4.

The frame of the apparatus is indicated at 15 and supports a primary sizing unit 16 near one end, a series of other sizing units 17 spaced from the unit 16 and a sorting belt 18 interposed between the units 16 and 17. Mounted on the frame 15 adjacent the front or feed end of the sizing unit 16 is a feed table comprising a series of longitudinally extending slats 19 which extend aslant rearwardly and downwardly. This general organization is clearly shown in Fig. 1 of the drawings and the other views are more especially referred to for the details of their construction.

The primary sizing unit 16 is constructed as follows:

Mounted on the frame 15 are bearings 20 supporting a pair of spaced shafts 21 at substantially the same level. Mounted at a higher level on the frame 15 at opposite sides thereof, are bearings 23 in which is journaled a shaft 24. The shafts 21 and 24 are each provided with a pair of pulleys 25, one at each side of the frame.

Endless belts 26 extend around the lower and upper pulleys at opposite sides of the frame. The belts 26 carry bearings 27, those on one belt being alined transversely with those on the other belt. Journaled in each pair of opposed bearings is a roller 28 which may be covered by rubber or other suitable material indicated at 29.

The end portions of the rollers 28 run upon rails 101 along the upper run of the belts 26 so that rotation of said rollers will be effected. Beneath the upper run of the belts 26 are transversely extending chutes 102 and positioned to discharge into the transverse chutes is a longitudinally extending shute 103 preferably having a fabric bottom 104. The chute 103 slopes with the belts 26.

From the foregoing it will be clear that the belts 26 extend aslant rearwardly and upwardly, the forward ends thereof being below the level of the rear end of the platform slats 19.

The sorting belt 18 is constructed as follows: Mounted on the frame 15 are bearings 30 for transverse shafts 31. On these shafts are mounted rollers 32 which operate a conveyor belt 33 of canvas or other suitable material. At the longitudinal margins of the belt 33 are provided the conveyor sides 34 having extensions 35 above the upper run of the belts 26, slightly above the level of the rollers 28. These sides prevent the fruit from rolling laterally from the units 16, 18. The belt 33 is of a width substantially corresponding to the length of the rollers 28.

Above the belt 33 and extending longitudinally thereof is a partition 36 which is deflected at one side at its front end, as indicated at 37, so as to meet one of the sides 34. This causes all of the fruit carried by the sizing unit 16 to discharge onto that portion of the belt 33 positioned to one side of the partition 36. The belt 33 is slightly below the level of the rear end of the sizing unit 16 and bridging the space between said units is a rearwardly and downwardly extending chute 38.

The sizing units 17 are duplicates of one another with the exception of relative proportions therebetween as will be made clear hereinafter. Therefore, a description of one of the sizing units 17 will suffice for all of them. Each unit 17 is constructed as follows:

Mounted on opposite sides of the frame 15 are lower bearings 39 and upper bearings 40. Journaled in the bearings 39 is a shaft 41 provided with flanged pulleys 42, and journaled in the bearings 40 is a shaft 43 provided with loose pulleys 44. There is a pair of pulleys at each side of the frame and upon each pair is mounted an endless belt 45. Mounted on the outer face of the belt 45 are bearings 46 for transversely extending rollers 47. The rollers 47 are preferably covered with rubber or other suitable yielding material as indicated at 48.

The rollers 48 are provided at intervals therealong with annular grooves 49. Each groove of each of the rollers 47 is alined with a groove of each of the other rollers and each longitudinally alined set of grooves is engaged by a longitudinally extending endless division member 50. These division members 50 are preferably self-tensioning and may be constructed of coiled spring wire as clearly shown in Fig. 9. The distance between each two adjacent rollers 47 is the same as the distance between each two adjacent division members 50 so as to form square openings 51. The belts 45, bearings 46, rollers 47 and division members 50 together constitute an endless rotary screen having a definite size of mesh through which discharges only the fruit of which the maximum diameter is slightly less than the size of the mesh of the screen.

The adjacent units 17 overlap one another, that is to say the rear or lower end of each unit extends rearwardly of and below the front end of the unit immediately to the rear thereof. Also the rear ends of the units are above the level of the forward ends thereof so that each unit extends aslant rearwardly and upwardly. In order that the units 17 may be compactly placed, there are provided guards 52 which are secured at their opposite ends to the frame 15 and extend between adjacent units 17 so as to prevent the rollers of one unit interferring with the rollers of the adjacent unit, as would result from sagging of the lower runs of the belts 45.

Extending beneath the end portions of the rollers 47 are supporting rails 53 for the rollers to run on so that said rollers will be caused to rotate. The space between the rails 53 is open and beneath said space run transversely extending conveyor belts 54 preferably constructed of canvas or like material, the sides of the conveyor being indicated at 58, 59. The belts 54 run on pulleys 55 mounted on shafts 56. The shafts 56 are journaled in bearings 57 attached to the conveyor sides 58, 59. The side 58 extends to and supports the lower end of the rails 53, and resting on the upper edge of the conveyor side 59 is the lower end of a chute 60 which extends aslant rearwardly and upwardly beneath the space that exists between the rails 53. Thus any fruit that discharges through the meshes of the sizing unit, after it is carried rearwardly of position over the belt 54, will fall into the chute 60 and discharge from said chute onto the belt 54. The bottoms 61 of the chutes 60 are preferably constructed of fabric so as to avoid bruising the fruit.

Each shaft is provided with a rotary fender constructed as follows:

On the shaft 43 is mounted a pair of rotary members 62 provided with flat faces 63 to which are bolted at 64 transversely extending slats 65. Between each two adjacent flat faces 63 each member 62 is provided with a concave face 66, and adjacent concave faces are spaced to conform with the pitch of the rollers 47. Thus when the rollers 47 are in engagement with the members 62, the slats 65 engage the division members 50. From this it is clear that any fruit that reaches the upper end of any of the sizing units 17, and that may be caught in the mesh of the rotary screen, will be engaged by one of the slats 65 and pushed upwardly to free it from the rollers and divisional members so that it can discharge from said sizing unit onto the next succeeding sizing unit or, having reached the last sizing unit and being too large to pass therethrough, onto the last conveyor belts 54. It will be understood that the rotary members 62 for the different units are of different diameters to agree with the different spacing of the rollers 47.

Beneath the sorting belt 18 is an endless conveyor belt 67 running over pulleys 68 on shafts 69. The shafts 69 are journaled in bearings 70 mounted on the frame 15. At intervals along the belt 67 are chutes 71 arranged with their discharge ends just above the level of said belt. The chutes 71 have their mouths adjacent one of the margins of the sorting belt 33 so that persons doing the sorting can readily place fruit, that they may select from the sorting belt, in either of the chutes 71. Conveyor sides 72, 73 are provided along the margins of the belt 67, the side 72 being provided with an opening 74. Extending diagonally across the upper face of the belt 67 from the side 72 to the side 73, adjacent the opening 74, is a deflecting end member 75 for directing fruit from the belt 67 through the opening 74.

The driving mechanism of the apparatus is constructed as follows:

Extending lengthwise of the frame 15 on opposite sides thereof are shafts 76, 77, provided at one end with sprocket wheels 78 connected by a crossed sprocket chain 79 so that said shafts will turn in opposite directions. The shafts 76, 77 are journaled in bearings 80 mounted on the sides of the frame 15. The shaft 76 is provided with a series of bevel pinions 81 meshing with bevel gears 82 mounted on the shafts 43. Thus the sizing units 17 are driven by operation of the shaft 76.

Both shafts 76, 77 are provided with sprocket wheels 85 connected by sprocket chains 86 to other sprocket wheels 87 which are mounted on the shafts 56 so as to drive the transverse conveyor belts 54. The forwardmost shaft 43 is provided with a sprocket wheel 88 to drive a sprocket chain 89 engaging a sprocket wheel 90 on the conveyor shaft 69, thus to drive the conveyor belt 67. The shaft 76 is itself driven by a sprocket wheel 91 connected by a sprocket chain 92 to a sprocket wheel 93 mounted on a shaft 94. The shaft 94 may be driven by any desired type of prime mover, such as that indicated at 95.

The shaft 76 is provided with another sprocket wheel 96 connected by a sprocket chain 97 to a sprocket wheel 98 on a shaft 99 that extends above the level of the shaft 76. The shaft 99 is provided with a bevel pinion 83 meshing with a bevel gear 84 mounted on the shaft 24. Through the driving connections just described, the sizing unit 16 is driven.

It is to be noted that an extension 100 of the partition 36 extends just above the rollers 47 of the sizing units 17. It has been hereinbefore mentioned that with the exception of certain relative proportions the sizing units 17 were of like construction. The only difference between them is in the size of the mesh openings 51, the mesh increasing in size from front to rear or from feed to discharge end of the series of units 17. The width of the partition 100 may vary at the different units 17 according to the size of mesh employed for said unit so that the mesh of the screen will be of the same size adjacent the partition as farther away. This will prevent fruit that should pass through the mesh of one sizing unit from being carried along and discharged onto the next succeeding unit 17, and also prevent larger fruit from discharging through a sizing unit that should pass it to the next unit.

Assuming that the prime mover 95 is turning the shaft 7, the apparatus operates as follows:

Because of its great utility in sizing elongate or oblate fruit bodies it will be assumed, for example, that apples of such shapes are being supplied to the apparatus. The apples will be placed on the slats 19 and will roll thence onto the lower portion of the sizing unit 16. As the rollers 28 ascend they carry the apples along with them and the apples are turned over and over by the rollers, since the rollers themselves are rotated by reason of them riding upon the rails 101. These rollers are spaced comparatively close together so that none but the extremely small apples pass between the rollers. The apples passing through the sizing unit 16 discharge either directly into the laterally extending chutes 102 or first into the longitudinal chute 103 from which they discharge into either of the lateral chutes 102.

Those apples that are sufficiently large to be retained upon the sizing unit 16 will be conveyed upwardly and rearwardly and discharged upon the sorting belt 33. Sorters will be positioned along the conveyor side 34 and will grade the apples according to appearance into two grades. They may be graded, for example, according to color intensity, the most colorful ones being allowed to remain on that portion of the belt 33 nearest the sorters, and those having less color being placed by the sorter upon that portion of the belt on the side of the partition 36 farthest from him.

The apples thus graded, according to appearance, into two lots discharge from the belt 33 on opposite sides of the partition 100 upon the foremost of the sizing units 17. The rollers 47 while travelling upwardly and rearwardly are caused to rotate by engagement with the rails 53, thus turning the apples over and over so that any apple that is smaller than the mesh of said sizing unit will discharge therethrough, either directly upon one of the transverse belts therebeneath or first into the chute 60 whence they discharge upon the belts 54.

The apples that remain upon the first sizing unit 17, because of larger diameter than the mesh thereof, are carried to the upper end of said sizing unit and the slats 65 push the apples upwardly from between the rollers and belts 50 at the point where said rollers and belt discharge the apples upon the next succeeding sizing unit 17.

The apples that are larger than the mesh of any particular sizing unit 17 will discharge therefrom onto the next succeeding sizing unit and thus the apples will be graded by the series of units 17 into as many different sizes as there are grading units 17 plus one multiplied by the number of divisions into which each unit is divided by the partition 100. In the present instance there are five grading units 17 and one partition 100, thus providing for six sizes of apples of one color grade and six sizes of another color grade. That is to say, each sizing unit 17 discharges two color grades of one side through its meshes, and the last sizing unit discharges the largest of the apples from the upper end of said unit upon the rearmost conveyor belts 54.

The importance of the rollers 29, 47 will be understood, when it is considered that they cause the fruit bodies to be turned over and over so that they cannot discharge through the mesh of the sizing unit unless the longest diameter of the fruit is less than the widths of the space between adjacent rollers and between adjacent belts 50. If in place of the rollers there were mere slats that did not rotate, and an oblong or oblate apple were deposited on the sizing unit with its short diameter parallel to the plane of the rollers, the apple would immediately drop through the sizing unit, but the rollers and endless division members 50 engaged by such apple, because they do rotate, immediately turn the apple and thus prevent it from passing through the sizing unit, and said apple is therefore carried to the next succeeding unit. An apple whose greatest diameter is less than the mesh of the sizing unit on which it is discharged will pass through the mesh, even though it be turned by turning of the rollers.

Between adjacent sizing units 17 are chutes 105 which extend aslant downwardly and rearwardly so that the fruit will roll onto the unit 17 instead of falling thereon.

When the sorters are working at the belt 33, if they see any imperfectly shaped fruit or fruit having blemishes, such fruit will be deposited by them into the mouths of the chutes 71.

We claim:

1. In a sizing apparatus, the combination of spaced sizing units, a sorting belt to receive fruit from one of the sizing units and discharge it upon the other sizing unit, means to direct all of the fruit from the first sizing unit to one side of the sorting belt, and means to operate the sizing units and the sorting belt.

2. In a sizing apparatus, the combination of spaced sizing units, a sorting belt to receive fruit from one of the sizing units and discharge it upon the other sizing unit, means to direct all of the fruit from the first sizing unit to one side of the sorting belt, a chute having its mouth positioned adjacent one margin of the sorting belt, and means to operate the sizing units and the sorting belt.

3. In a sizing apparatus, the combination of spaced sizing units, a sorting belt to receive fruit from one of the sizing units and discharge it upon the other sizing unit, means to direct all of the fruit from the first sizing unit to one side of the sorting belt, a conveyor beneath the sorting belt, a chute having its mouth positioned adjacent one margin of the sorting belt and discharging onto the conveyor, and means to operate the sizing units and sorting belt and conveyor.

4. In an apparatus for sizing approximately spherical objects, the combination of rotatably mounted endless belts, transversely disposed rollers rotatably mounted on the belts in spaced relation, means for effecting rotation of the rollers to rotate the objects as they are carried by the rollers, and means providing a plurality of paths parallel to the belts for maintaining each of said objects against travel endwise of the rollers.

5. In a sizing apparatus, the combination of rotatably mounted endless belts, rollers rotatably mounted on the belts in spaced relation and having annular grooves, rails for the rollers to run on, means beneath the rollers to receive fruit discharging therebetween, endless division members engaging the grooves of the rollers, and means to operate the belts.

6. In a sizing apparatus, the combination of rotatably mounted endless belts, rollers rotatably mounted on the belts in spaced relation and having annular grooves, rails for the rollers to run on, means beneath the rollers to receive fruit discharging therebetween, self-tensioning division members engaging the grooves of the rollers, and means to operate the belts.

7. In a sizing apparatus, the combination of rotatably mounted endless belts, rollers rotatably mounted on the belts in spaced relation and having annular grooves, rails for the rollers to run on, means beneath the rollers to receive fruit discharging therebetween, coiled spring wire members engaging the grooves of the rollers, and means to operate the belts.

8. In a sizing apparatus, the combination of a plurality of sizing units arranged in a series, each unit comprising rotatably mounted endless belts, rollers rotatably mounted on the belts in spaced relation, the spacing of the rollers of each succeeding unit being greater than the spacing of the rollers of the preceding unit, means to operate the belts, means to effect turning of the rollers as they are propelled by the belts, and means beneath the rollers to receive fruit discharging therebetween.

9. In a sizing apparatus, the combination of rotatably mounted endless belts, transverse screening members connected with the belts in spaced relation, rotatably mounted endless division members forming longitudinal screening members extending over the transverse members, means to operate the belts, means to rotate the division members, and means beneath the transverse members to receive fruit discharging therebetween.

10. In a sizing apparatus, the combination of spaced rollers, means to effect rotation of said rollers, means to effect translation of said rollers, endless division members extending over the rollers, means to rotate the division members, and means beneath the rollers to receive fruit discharging therebetween.

Signed at Riverside, California, this 9 day of February, 1922.

FRED STEBLER.
RALPH E. DAVIS.